June 28, 1932. H. GORA 1,864,903
MACHINE FOR CUTTING RINGS
Filed Jan. 11, 1932   2 Sheets-Sheet 2
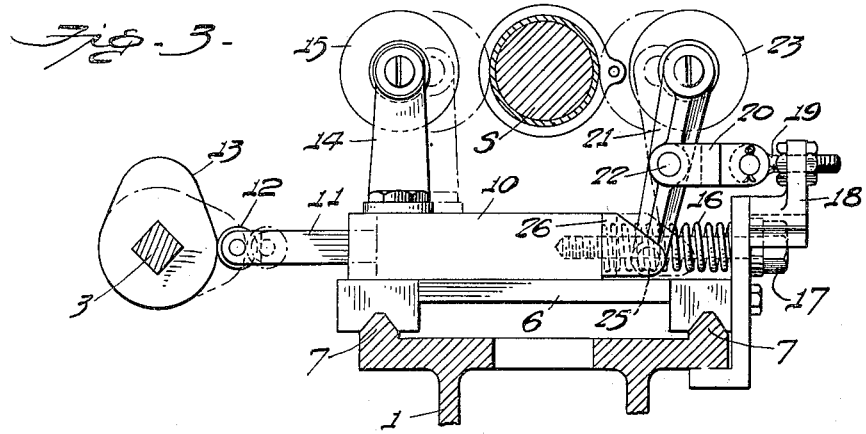
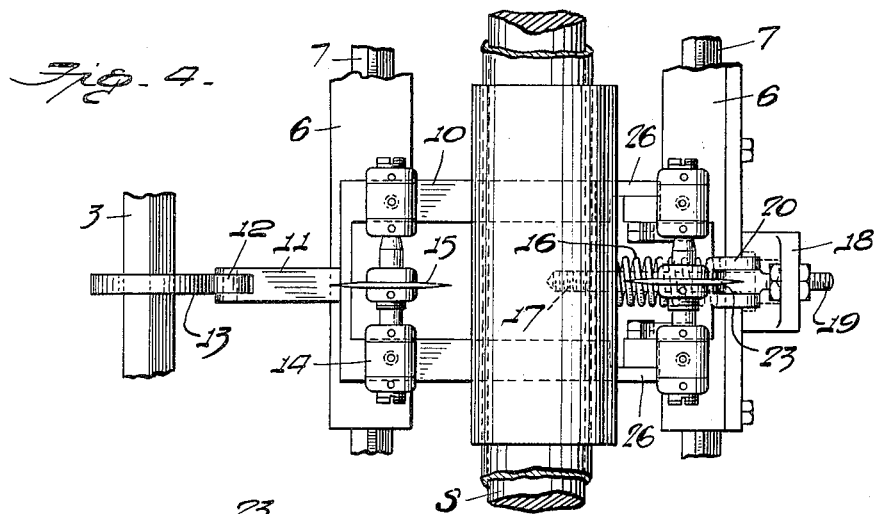
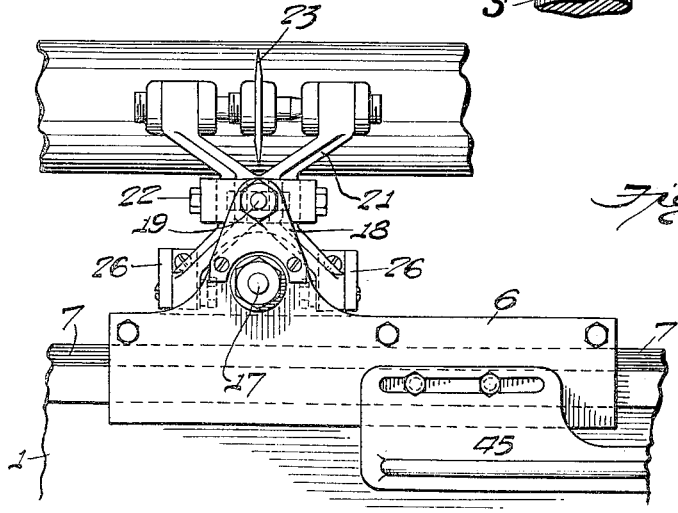
INVENTOR
Henry Gora
BY
Ritter, Machlin & O'Neill
ATTORNEY Patented June 28, 1932

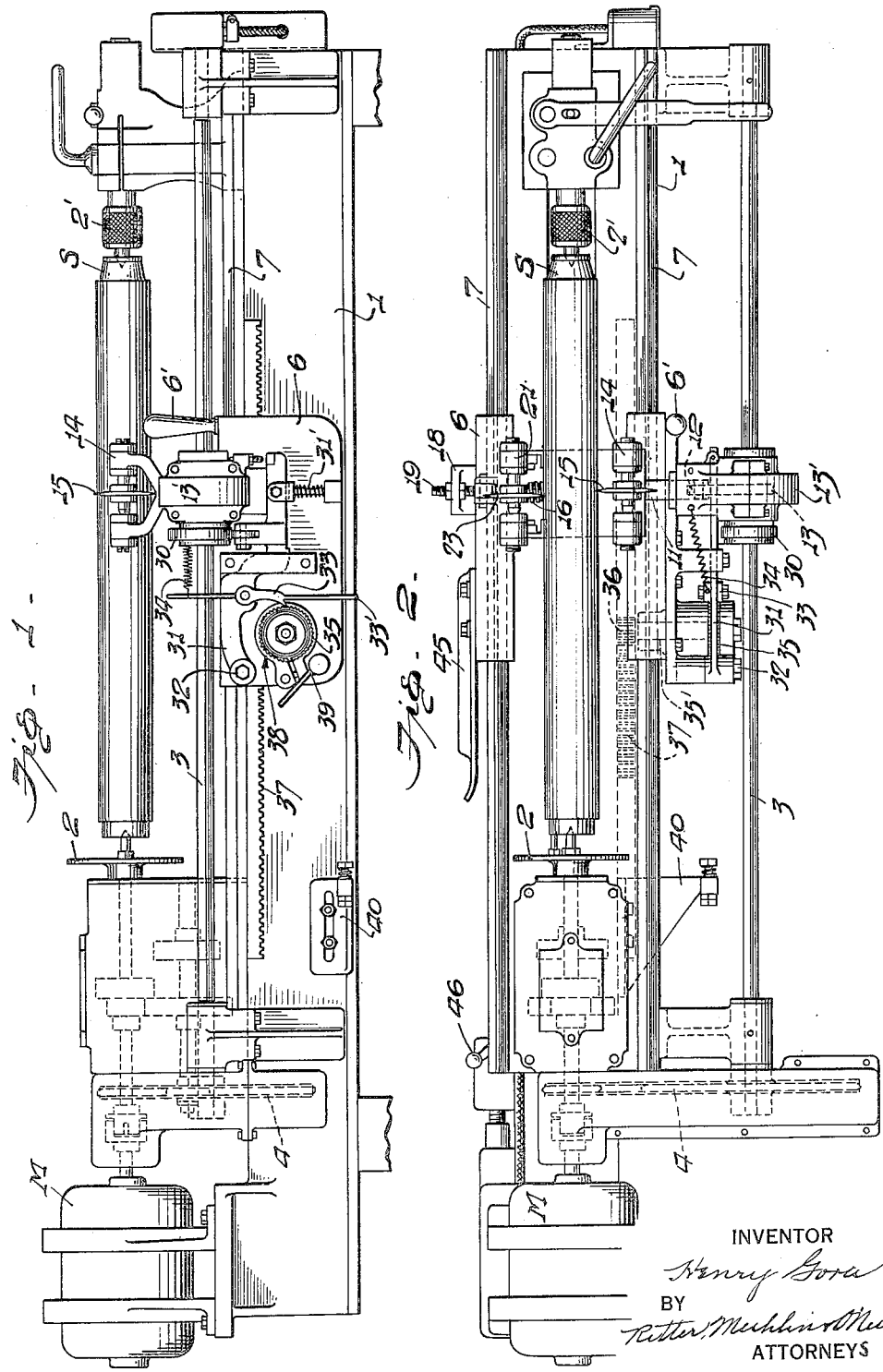

1,864,903

UNITED STATES PATENT OFFICE

HENRY GORA, OF BRIDGEPORT, CONNECTICUT, ASSIGNOR TO JENKINS BROS., OF NEW YORK, N. Y., A CORPORATION OF NEW JERSEY

MACHINE FOR CUTTING RINGS

Application filed January 11, 1932. Serial No. 586,042.

The invention relates to certain improvements in machines for cutting annuli from tubing of flexible material, such as rubber, carried upon a rotating mandrel, and has for its object to provide such a machine with cutters mounted on opposite sides of the mandrel, operating in parallel planes offset a distance equal to the thickness of one annulus, said cutters being simultaneously moved toward and away from the mandrel; whereby two annuli will be cut at each operation and the stresses imposed on the tubing by the cutters will be substantially equal and opposite in direction and buckling or distortion of the fabric of the tubing will be practically eliminated.

The invention is illustrated in the accompanying drawings, in which:—

Fig. 1 is a partial sectional elevation of a standard lathe-like cutting machine to which the invention is applied.

Fig. 2 is a plan view.

Fig. 3 is an enlarged fragmentary sectional end elevation showing the construction and arrangement of the cutters.

Fig. 4 is a plan view.

Fig. 5 is a fragmentary sectional rear elevation.

Referring to the drawings, 1 indicates the bed or frame of a more or less conventional or standard machine employed for cutting annuli from tubing of rubber or the like supported on a mandrel S, which is mounted between the head stock 2 and the tail stock 2' and is caused to rotate with the head stock by any positive connection between the face plate of the head stock and the mandrel, the connection being conventionally illustrated as a pin secured to the face plate and engaging a socket at the end of a mandrel eccentric to the axis of the latter. The head stock is driven from an electric motor M mounted on the machine frame by the usual selective gearing such as employed in lathes, the shaft of the head stock being connected to a squared feed shaft running longitudinally of the machine frame and journaled in bearings on said frame, the operative connection between the head stock shaft and the squared shaft 3 being chain and sprocket drive 4.

Slidably mounted on guide rails 7, 7, running longitudinally of the machine frame is a cutter carriage 6, upon which is mounted, for transverse reciprocation, a slide 10, on the forward end of which is fixed a standard 14, in the upper forked ends of which is journaled a rotary cutter disk 15, the slide being advanced to engage the cutter with the work by means of a cam 13 slidably mounted on squared shaft 3, said cam engaging a roller 12 journaled in the end of an extension arm 11 of the slide 10. The slide is moved in the opposite direction by means of a helical spring 16 mounted on a bolt 17 secured to the slide 10 and passing through an opening in the front plate of the carriage 6.

The cutter carriage is indexed or advanced step by step between the successive cutting operations by means of cam 30 slidable on shaft 3 and engaging a rock lever 31 pivoted at 32 to the front plate of the carriage 6, said lever being held in engagement with the cam 30 by means of spring 31'. Mounted on the lever 31 is a pawl 33 cooperating with the ratchet wheel 35 of the indexing mechanism, the upper end of the pawl being connected to a stationary part of the carriage by the helical spring 34, which serves to hold the pawl in engagement with the ratchet. The pawl is also provided with a lower extension arm 33', which is adapted to engage an adjustable stop 40 fixed to the bed or frame 1 of the machine. The ratchet wheel 35 is mounted on shaft 35' journaled on the carriage 6 and carries on its inner end a pinion 36 meshing with a stationary rack 37 secured to the frame of the machine. Brake 38, controlled by hand lever 39, serves to lock the ratchet wheel 35 to its shaft, and, when released, permits the carriage to be moved by hand and returned to its initial position by means of a handle 6'. Thus far described, the machine is of the standard type commonly employed for cutting a single annulus from a length of rubber tubing mounted on the mandrel S, the cutter carriage being indexed or advanced between cutting operations a distance equal to the thickness of an annulus to be cut and the cutter being advanced, between indexing operations, into engagement with the tubing by the cam 13 forcing slide 10 transversely of the carriage 6, the helical spring 16 serving to return the slide and retract the cutter, as the high part of the cam 13 passes out of engagement with the rear extension of the slide.

The machine, as described, is of the conventional type well known in the art, but is subject to the limitation that it cuts but one ring or annulus at each operation and to the objection that the rotary knife, upon engaging the tubing, is liable to distort the latter, unless conditions are just right, with the result that the severed rings are imperfect. It has been suggested to increase the output of the machine by employing multiple cutters or rotary knives arranged in axial alignment to effect the cutting of a like number of rings or annuli at one operation, but this arrangement has been found to aggravate the difficulty due to the distortion of the tubing on the mandrel, during the cutting operation, by increasing the distorting forces in substantially the same proportion as the increase in the number of cutters.

The present invention is designed to double the output of the single cutter machine and to avoid any distortion of the tubing during the cutting operation, by employing knives disposed on opposite sides of the mandrel, which knives operate in parallel planes offset a distance equal to the thickness of one annulus, so that two rings are cut at each operation and the stresses of the knives against the tubing are exerted in equal amounts but in opposite directions, thereby preventing any buckling or distortion of the tubing and resulting in substantially perfect rings or annuli. The second knife and its accessories may be applied to the standard machine without any material alteration in the construction of the latter and, therefore, may be built as a special attachment for standard machines, or, if desired, may be constructed as an integral part of new machines.

Secured to the front face plate of the carriage 6 is a bracket-like extension 18 having a threaded opening in its upper portion to receive an eye bolt 19, which is secured in adjusted position by means of set nuts. Pivoted to the eye bolt is a yoke 20 carrying a pintle 22 upon which is pivoted a rock lever 21, which is preferably X-shaped, the upper ends of the cross arms being provided with adjustable bearings in which is journaled the spindle of a rotary cutter 23, the cutter and the adjustable bearings therefor being substantially like the fixed cutter 15 and its corresponding accessories. The lower cross arms are connected by pins at their lower ends to bracket pieces 26 fixed to the end of the slide 10, so that, when the slide is advanced to effect a cut, both knives are simultaneously moved into engagement with the tubing on the mandrel, as indicated in dotted lines in Fig. 3, the knife 23 being swung about the pivotal axis 22 of the rock lever 21. The retraction of both knives is effected by the spring 16, which returns the slide 10 to its initial position, after the high part of cam 13 has moved out of engagement with the extension 11 of the slide. As indicated, the knife 23 is adjusted so as to operate in a plane parallel to the plane of operation of the cutter 15, said planes being offset or spaced a distance equal to the thickness of one annulus, which distance may be readily determined and adjusted by adjusting either of the knives on its spindle or adjusting either of the spindles in its bearings. The indexing or feeding mechanism for the carriage is likewise adjusted to effect movement of the carriage longitudinally of the spindle between each cutting operation a distance equal to the thickness of two annuli. This adjustment may be effected by the standard indexing means illustrated, to increase or decrease the movement of the lever 31, which actuates the pawl 33 cooperating with the ratchet 35. As this adjusting means is conventional in the art and is clearly illustrated in the drawings, a more detailed description thereof is deemed unnecessary.

As indicated in Fig. 2, the machine is provided with an arm 45 mounted on the rear face of the carriage, which is effective to engage and throw switch 46 to break the circuit to the motor, when the carriage reaches the end of its movement, at which time the downwardly projecting arm of the pawl 33 engages the adjustable stop 40 to disengage the pawl from the ratchet wheel, so that, when the brake 38 is released by its operating lever 39, the carriage may be returned to its initial position by means of the handle 6'.

The operation of the machine is the same as that of the standard machine upon which it is mounted, except that each cutting operation effects the cutting of two rings or annuli and the intermittent feeding movements of the cutter carriage are equal in extent to the thickness of two annuli and, as the operation of the machine is entirely automatic during the cutting operations, a given length of tubing on the mandrel will be cut into a series of perfect rings in half the time required by a machine employing a single cutter, or alternatively, the output of the improved machine will be double that of the single cutter machine in a given period of time.

What I claim is:

1. In a machine for cutting annuli from tubes including a tube supporting mandrel, a cutter carriage, means for driving the mandrel and means for intermittently feeding the carriage longitudinally of the mandrel; two cutters mounted on said carriage on opposite sides of the mandrel operating in parallel planes and offset a distance equal to the thickness of a single annulus, and means for effecting simultaneous operative movements of the cutters.

2. In a machine for cutting annuli from tubes including a rotating tube supporting mandrel and a cutter carriage movable longitudinally of the mandrel; a cutter slidably mounted on said carriage on one side of the mandrel, a second cutter pivotally mounted on the carriage on the opposite side of the mandrel, and means for simultaneously moving the cutters toward and from the mandrel.

3. In a machine for cutting annuli from tubes including a rotating tube supporting mandrel and a cutter carriage movable longitudinally of the mandrel; a cutter slidably mounted on said carriage on one side of the mandrel, a second cutter pivotally mounted on the carriage on the opposite side of the mandrel, and means for simultaneously moving the cutters toward and from the mandrel, the cutters being offset a distance equal to the thickness of a single annulus.

4. In a machine for cutting annuli from tubes including a rotating tube supporting mandrel and a cutter carriage movable longitudinally of the mandrel; a slide movable transversely of said carriage, a cutter fixed to said slide adjacent one side of the mandrel, a second cutter pivoted to said carriage on the opposite side of the mandrel and connected to said slide, and means for reciprocating said slide.

5. In a machine for cutting annuli from tubes including a rotating tube supporting mandrel, a cutter carriage movable longitudinally of the mandrel, a slide movable transversely of the carriage, and a cutter fixed to said slide adjacent one end thereof; a second cutter pivotally mounted on the carriage adjacent the opposite side of the mandrel and engaged with the opposite end of said slide, said cutters being offset a distance equal to the distance of a single annulus, and means for reciprocating said slide.

6. Annuli cutting means, comprising a carriage adapted to be indexed longitudinally of a rotating tube supporting mandrel, a slide movable transversely of said carriage, a rotary cutter fixed to one end of said slide, a rock lever pivoted intermediate its length to said carriage and connected at its lower end to said slide, and a second rotary cutter mounted on the upper end of said rock lever, said cutters being offset a distance equal to the distance of a single annulus, and means for reciprocating said slide.

7. Mechanisms for cutting annuli from a tube carried upon a rotating mandrel, comprising two cutters disposed on opposite sides of the mandrel and offset from each other a distance equal to the distance of a single annulus, means for simultaneously moving said cutters toward and from the mandrel, and means for intermittently advancing the cutters longitudinally of the mandrel distances equal to the thickness of two annuli.

In testimony whereof I affix my signature.

HENRY GORA.